United States Patent
Yao

(10) Patent No.: US 7,262,885 B2
(45) Date of Patent: Aug. 28, 2007

(54) STOCHASTIC HALFTONE SCREENING METHOD

(75) Inventor: Meng Yao, West Linn, OR (US)

(73) Assignee: Xerox Corporation, Stamford, CT (US)

( * ) Notice: Subject to any disclaimer, the term of this patent is extended or adjusted under 35 U.S.C. 154(b) by 946 days.

(21) Appl. No.: 09/888,668

(22) Filed: Jun. 25, 2001

(65) Prior Publication Data
US 2002/0196469 A1    Dec. 26, 2002

(51) Int. Cl.
*H04N 1/405* (2006.01)
*G06K 15/00* (2006.01)

(52) U.S. Cl. .............. 358/3.06; 358/1.9; 358/3.06; 358/319; 358/535; 362/257

(58) Field of Classification Search ............ 358/1.9, 358/3.06, 3.19, 538, 536; 382/237
See application file for complete search history.

(56) References Cited

U.S. PATENT DOCUMENTS

| | | | | |
|---|---|---|---|---|
| 4,668,995 A | * | 5/1987 | Chen et al. ............ | 382/272 |
| 5,111,310 A | | 5/1992 | Parker et al. .......... | 358/456 |
| 5,323,247 A | | 6/1994 | Parker et al. .......... | 358/456 |
| 5,341,228 A | | 8/1994 | Parker et al. .......... | 358/534 |
| 5,477,305 A | | 12/1995 | Parker et al. .......... | 358/456 |
| 5,543,941 A | | 8/1996 | Parker et al. .......... | 358/534 |
| 5,708,518 A | | 1/1998 | Parker et al. .......... | 358/534 |
| 5,726,772 A | | 3/1998 | Parker et al. .......... | 358/456 |
| 6,597,813 B1 | * | 7/2003 | Stanich et al. ......... | 382/237 |

OTHER PUBLICATIONS

Theophano Mitsa and Kevin J. Parker, "Digital Halftoning Using a Blue Noise Mask", SPIE vol. 1452 Image Processing Algorithms and Techniques II (1991), pp. 47-56.
Meng Yao and Kevin J. Parker, "Modified Approach to the Construction of a Blue Noise Mask", Journal of Electronic Imaging, Jan. 1994, vol. 3(1), pp. 92-97.

* cited by examiner

*Primary Examiner*—Aung S. Moe
*Assistant Examiner*—Peter K. Huntsinger

(57) ABSTRACT

A method for halftoning a gray scale image to generate a halftoned image uses a stochastic screen is designed to provide visually pleasing, blue noise dot profiles when thresholded at any gray level and wherein substantially all the threshold values corresponding to gray levels between $g_{s1}$ and $g_{s2}$ coincide with black positions in a constraining checkerboard pattern and substantially all the threshold values corresponding to gray levels between $g_{s2}$ and $g_{s3}$ coincide with white positions in the constraining checkerboard pattern.

15 Claims, 5 Drawing Sheets

STOCHASTIC HALFTONE SCREENING METHOD

BACKGROUND

The present invention is directed to a method and apparatus for halftoning images, and more particularly, to the generation of stochastic screens for use in halftoning digital images.

In the digital reproduction of documents, images are conveniently represented as one or more color planes or separations that can be combined at printing to yield a color print. Each image separation is an arrangement of pixels each of which corresponds to a different location of the image and describes the image density at that location. Typically an image separation comprises a raster image which may be described as an of array pixels. Image density typically is described as one level in a number of possible states or levels. Commonly, color documents are formed using one separation describing density for each of a cyan, magenta, yellow and black colorant; although a larger number and/or alternative colorants may also be used.

Most printing systems have the ability to reproduce an image with a small number of levels, most commonly two, although other numbers are possible. On the other hand, common input devices are capable of describing an image with a substantially larger number of gray levels, with 256 levels a commonly selected number, although larger and smaller levels are possible. When more than two levels of density are used in the description of the image, the levels are often termed "gray", indicating that they vary between a maximum and minimum, and without reference to their actual color. Thus, given an image or a separation in a color image having perhaps 256 possible density levels, a set of binary printer signals must be produced representing the continuous tone scale of the input image. In such arrangements, digital halftoning or screening techniques in which digital input signals to a digital printer are modified prior to printing a hard copy are used such that a digitally printed version of a continuous tone scale image, e.g., a photographic image, creates the illusion of the continuous tone scale of the photographic original.

Typically, digital halftoning or screening techniques control the printing of spots to obtain the illusion of continuous tones based upon a comparison of the required shade of gray with one of a set of predetermined threshold levels. That is, over a given area in an image separation, each pixel in an array of pixels within the area is compared to one of a set of preselected thresholds such as is taught, for example, in U.S. Pat. No. 4,149,194 to Holladay. If the pixel value exceeds the given threshold level (the gray level is darker), a spot is printed. If the gray is not as dark as a given threshold level, a spot is not printed.

One type of screen that has been found to generate nice halftone patterns is a stochastic screen. A stochastic screen produces dots with a random nature, and its halftone patterns can be less visible than structured halftone patterns produced by traditional ordered dither. For most input levels the outputs of stochastic screens have "blue-noise" spatial spectra which provide pleasant appearance. Various methods exist for generating stochastic screens. One method of making a stochastic screen is to start with a stochastic halftone pattern at a certain level, and then use a low-pass filter to find the largest "voids" or "clusters" and reduce them to generate the halftone patterns for the remaining levels, and when all the levels have been visited, a stochastic screen can be generated by combining the halftone patterns of all levels.

Additional information on halftoning systems using a stochastic process known as a blue noise mask can be found in a family of patents to Parker et al., including U.S. Pat. Nos.: 5,111,310; 5,323,247; 5,341,228; 5,477,305; 5,543,941; 5,708,518; 5,726,772. Briefly, a blue noise mask can be generated as follows. Starting at a first gray level with a chosen dot pattern, or "seed", the process iteratively uses a Fast Fourier Transform (FFT) techniques with a "blue noise" filter to redistribute all spots in dot pattern and eliminate large visual "clumps." Next, the dot pattern is processed at the next gray level by increasing (or decreasing) certain number of black spots on the previously determined dot pattern (existing black (or white) spots are not moved). The same filtering technique is used to distribute newly added (or subtracted) dots. The above processing is then repeated for all gray levels sequentially. At each step, the width of the blue-noise filter varies by an amount corresponding to the current gray level. The summation of dot patterns for each gray levels is the blue noise mask generated.

Stochastic screens have been shown to provide good image quality in printers that use ink, such as solid ink printers and ink jet printers, which can print isolated dots reliably and accurately. However, when dot positioning is less accurate or reliable, halftone noise can be quite objectionable resulting in a noticeable reduction of image quality. Dot placement error often increases when the firing frequency of the jets increases. As the firing frequency goes up, there is more variation as to where the dots are placed. There are a variety of factors that can contribute to dot positioning errors. For example, inconsistencies and/or contaminants in the ink as well as the use of different inks may vary the flow rate in the print head, cause the ink to foul or clog nozzles in the print head, or change the thermal characteristics of the ink. Each these can result in variations in the amount and the location of ink deposition. Additionally, a variety of manufacturing flaws can impact the rate ink flows through or discharges from the print head; thereby resulting in inconsistent and inaccurate drop placement.

Another factor that contributes to the noise level in stochastic halftoning is the interaction between neighboring dots, which can be quite non-symmetric. For example, for some inks such as many of those with solid ink printers, dots can be congealed in a way that is very difficult to characterize. Even when two dot patterns are geometrically symmetric, they can have different visual effects. Furthermore, inconsistencies and/or contaminants in the ink also impact the way dots congeal as well as dot-to-dot interactions (such as agglomeration); thereby adding further complexity and unpredictability to the process. These printer artifacts, dot positioning errors and unfavorable dot-to-dot interaction, can combine to increase the noise level in stochastic halftoning on certain printers.

Thus, there is a desire to construct a halftone screen which exhibits robustness against printing artifacts such as frequency dependent dot placement and dot-to-dot interactions (such as agglomeration) while maintaining the favorable characteristics of a stochastic screen.

SUMMARY

There is described herein a processor for halftoning a gray scale image comprising a plurality of m-bit pixels to generate a halftoned image comprising a plurality of n-bit pixels. The processor includes a memory storing a stochastic screen comprising a set of threshold values and a comparator receiving the gray scale image and the screen. The comparator compares, on a pixel-by-pixel basis, a value of each pixel in the gray scale image to a corresponding threshold value in the screen to produce the halftoned image. The stochastic screen is designed such that substantially all the threshold values corresponding to gray levels between $g_{s1}$ and $g_{s2}$ coincide with black positions in a constraining checkerboard pattern and substantially all the threshold values corresponding to gray levels between $g_{s2}$ and $g_{s3}$ coincide with white positions in the constraining checkerboard pattern.

There is described herein a method for generating a halftone screen for converting an image received at d levels, for reproduction at c levels, where d>c. The method includes (A) generating an initial screen pattern for a first gray level, wherein substantially all black pixels in the initial screen pattern correspond to black pixels in a constraining checkerboard pattern; (B) generating a subsequent screen pattern corresponding to a specific gray level that is darker than the first gray level, the subsequent screen pattern maintaining the arrangement of black pixels of a screen pattern corresponding to a lighter gray level and further including at least one more black pixel, wherein the least one more black pixel is at a location corresponding to a black pixel in the constraining checkerboard pattern; (C) repeating (B) for a plurality of specific gray levels between the first gray level and a second gray level; (D) generating a second subsequent screen pattern corresponding to a specific gray level that is darker than the second gray level, the second subsequent screen pattern maintaining the arrangement of black pixels of every screen pattern corresponding to a lighter gray level and further including at least one more black pixel, wherein the least one more black pixel is at a location corresponding to a white pixel in the constraining checkerboard pattern; and (E) repeating (D) for a plurality of gray levels between the second gray level and a third gray level.

DETAILED DESCRIPTION OF THE INVENTION

Figure 1:
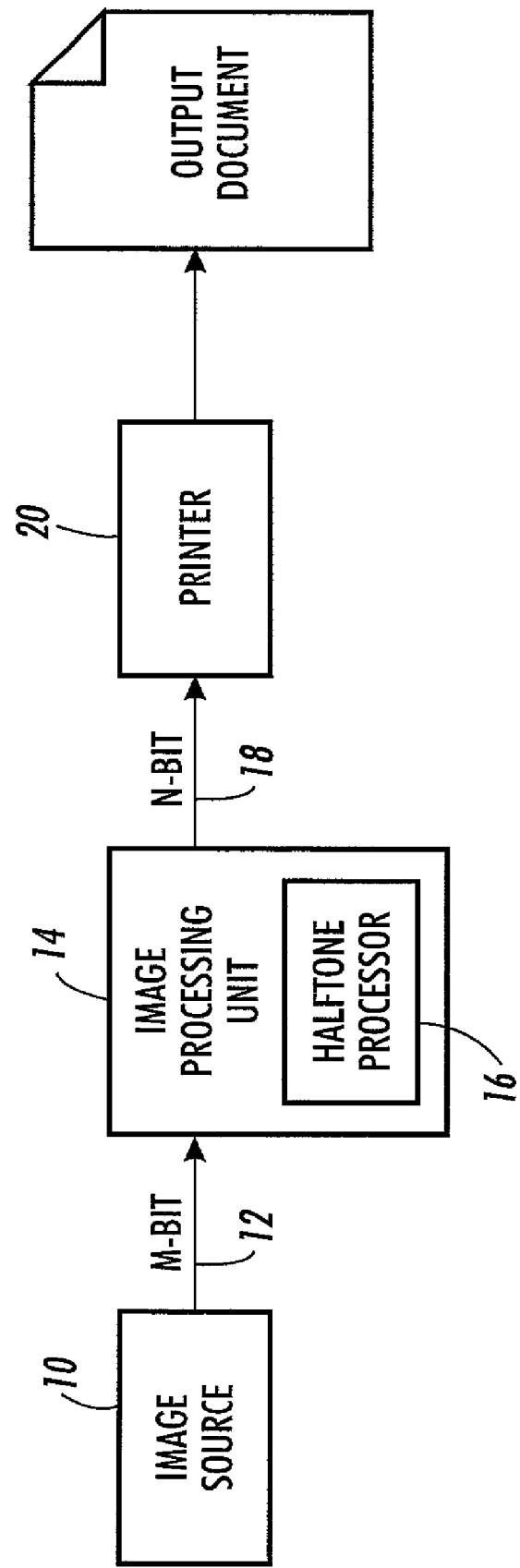
FIGS. 1 and 2 illustrate a general representation of a suitable system for generating a halftone image.

The following will be a detailed description of the drawings which are given for purposes of illustrating the embodiments of the present invention, and not for purposes of limiting the same. In this description, as well as in the drawings, like reference numbers represent like devices, circuits, or circuits performing equivalent functions.

In the following discussion, the term "dot pattern" refers to a product or an image resulting from a halftoning or screening process. A "screen pattern" for a given gray level g refers to a binary pattern of 1's and 0's identifying the location of the "ON" (black) and "OFF" (white) pixels, respectively, in a binary dot pattern for the given gray level. That is, the screen pattern for a gray level g corresponds to the dot pattern formed when a constant gray level image of level g is screened using a screen array or mask constructed from that screen pattern.

Turning now to FIG. 1, there is shown an embodiment of a digital imaging system that incorporates one or more features of the embodiments disclosed herein. The imaging system includes image source 10 which may include a computer, a network, a scanner, a digital camera or any similar or equivalent image input device providing an electronic representation of an original image or document in the form of image signals 12. Image signals 12 are supplied to an image processing unit 14 to be processed so as to produce image data 18 that is suitable for reproduction on image output terminal (IOT) or printer 20.

In the course of processing image signals 12, image processing unit 14 commonly converts the image signals into a format comprising multiple separations each of which comprises an array of m-bit pixels, if image signals 12 are provided in different format. Image processing unit 14 commonly includes halftone processor 16 which converts the m bit per pixel digital image signals to n bit image data 18, suitable for driving a particular IOT where n is an integer value and commonly with n=1. It is also well within contemplation to derive images electronically from image signals in the format of a page description language describing the appearance of the page. In such a case, the image processing unit might include a processing element for decomposition of the page.

In response to image data 18, IOT 20 generates an output document on suitable media (e.g., print or display). IOT 20 may beneficially comprise a solid ink printer or ink jet printer; however, the printer may include such equivalent alternatives as electrophotographic, ionographic, thermal, etc. Furthermore, it should be appreciated that system may be used to drive electronic display systems such as CRTs, LCDs, LED, etc.

Figure 2:
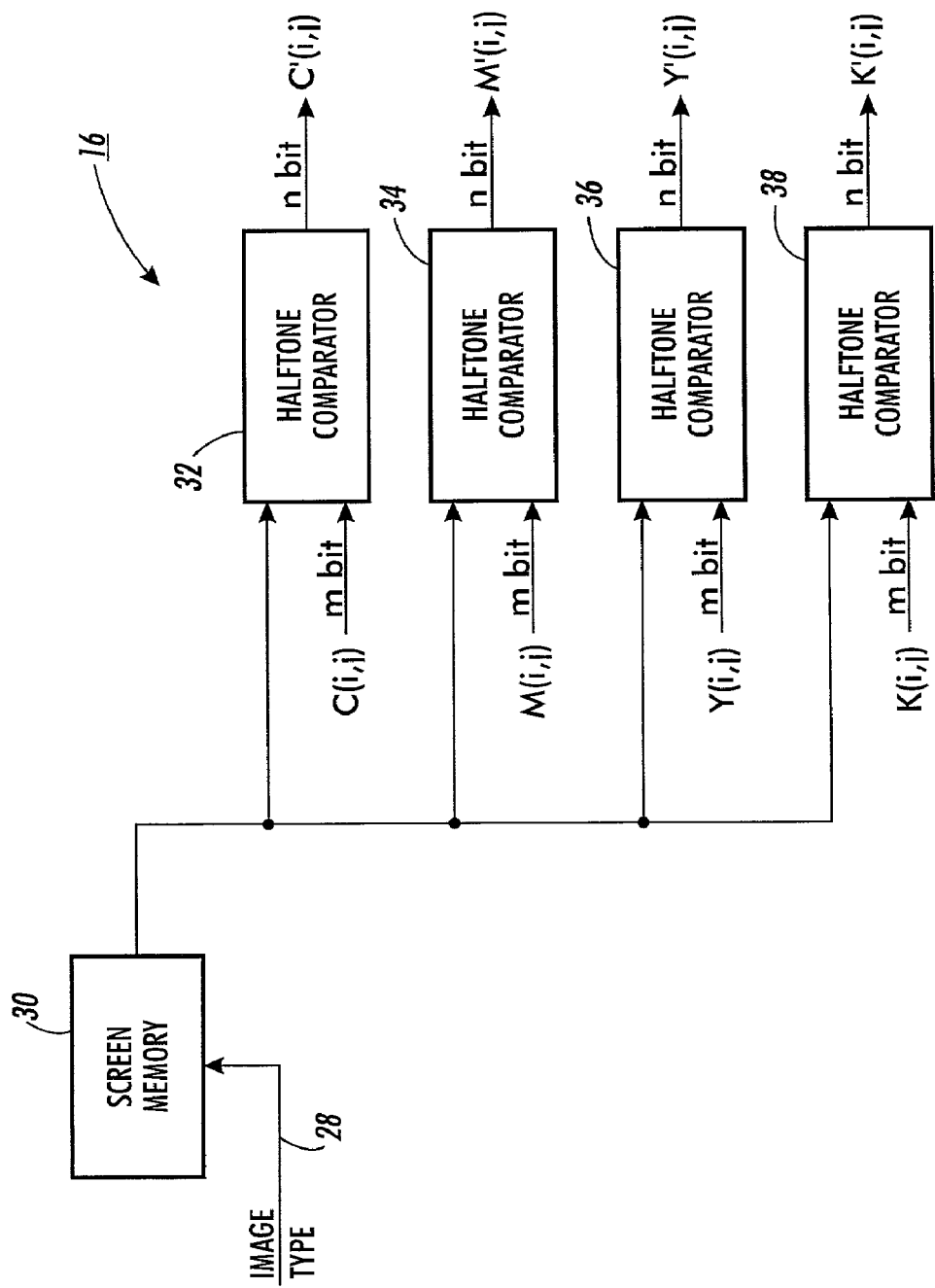

Referring now to FIG. 2, there is shown the operational characteristics of halftone processor 16. In this example, there is illustrated a color processing system, using four separations, C(i, j), M(i, j), Y(i, j), K(i, j), each of which is processed independently for halftoning purposes to reduce an m-bit input to an n-bit output. Although shown as operating on color image data comprising four separations, it will be appreciated that the principles described herein are equally applicable to color reproduction utilizing a different number of separations as well as to "black and white" reproduction utilizing a single separation.

Halftone processor 16 operates in a conventional manner performing a simple pixel by pixel comparison of a gray scale input against thresholds at corresponding locations in a screen array. In the halftone processor of FIG. 2, there is shown screen memory 30 comprising a source of screening information. Screen memory 30 provides a halftone screen to each comparator 32, 34, 36 and 38, where the other comparator input is an m-bit separation. The output is n bit output, which can be directed to a printer. Those skilled in the art will readily recognized that screen memory 30 may supply the same halftone screen to each comparator or different screens to the comparators. Screen memory 30 may further include input 28 providing an indication of the image type (e.g., high frequency halftone, low frequency halftone, pictorial, photographic, etc.) to be processed. In response to such an input, memory 30 may supply screens optimized for the identified image type.

Now, consider the screen array in generating halftoned images from constant gray-scale inputs. As discussed above, it is desired to use a screen which includes the benefits of a stochastic screen (e.g., blue noise patterns) and exhibits robustness against printing artifacts such as frequency dependent dot placement and dot-to-dot interactions. To reduce the impact of frequency dependent dot placement errors and dot-to-dot interactions, there is proposed using a "constrained stochastic screen" wherein a checkerboard pattern is used as a constraining pattern as the screen is generated. By constraining the halftone to place dots in an on-off pattern while building the screen pattern, considerable robustness against frequency dependent dot placement and dot-to-dot interactions is gained while, at the same time, the favorable characteristics of the blue noise pattern are maintained.

Figure 3:
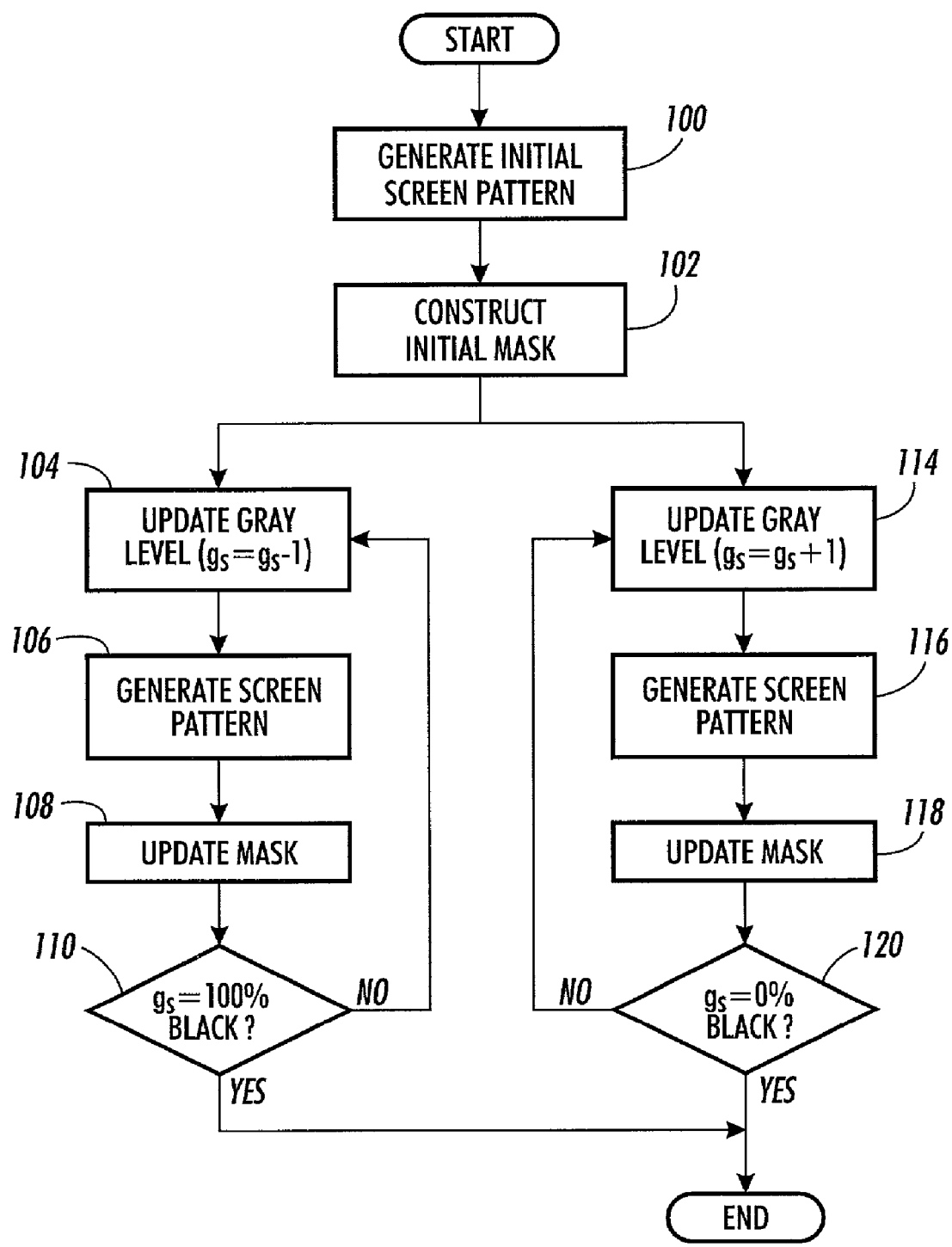
FIG. 3 is a flowchart illustrating an embodiment of a method for generating a constrained stochastic screen.

Referring now to FIG. 3, there is shown an embodiment of a method for generating a constrained stochastic screen using a checkerboard pattern as a constraining pattern. The process begins by constructing an initial screen pattern for an intermediate gray level $g_s$ ($0<g_s<255$, assuming m=8 bit pixels, wherein $g_s=0$ corresponds to 100% black and $g_s=255$ corresponds to 0% black) at step 100. It should be appreciated that when discussing the density of an image, the levels are often termed "gray", indicating that they vary between a maximum and minimum, and without reference to their actual color. Furthermore, when referring to a gray level of 100% black, it is meant to indicate the darkest gray level $g_s=0$ without reference to the actual color.

The initial screen pattern can be constructed using any known method or process for generating (or converting) a screen pattern such that the binary dot pattern will be a visually pleasing blue noise pattern. It should be appreciated that a pattern is considered a blue noise pattern if it has small or negligible low-frequency components. Furthermore, as used herein, the term visually pleasing indicates the properties of aperiodicity and lack of visible artifacts.

However, in constructing the initial screen pattern, the placement of the 1's in the screen pattern (black pixels in a corresponding dot pattern) is constrained by the checkerboard pattern imposed on the screen. That is, in generating the screen pattern, the process constrains the location of the 1's in the initial screen pattern such that leach location coincides with a black square in the checkerboard pattern imposed on the screen. This constraint on the placement of 1's ("black" pixels) in a screen pattern is illustrated in FIG. 4.

Figure 4:
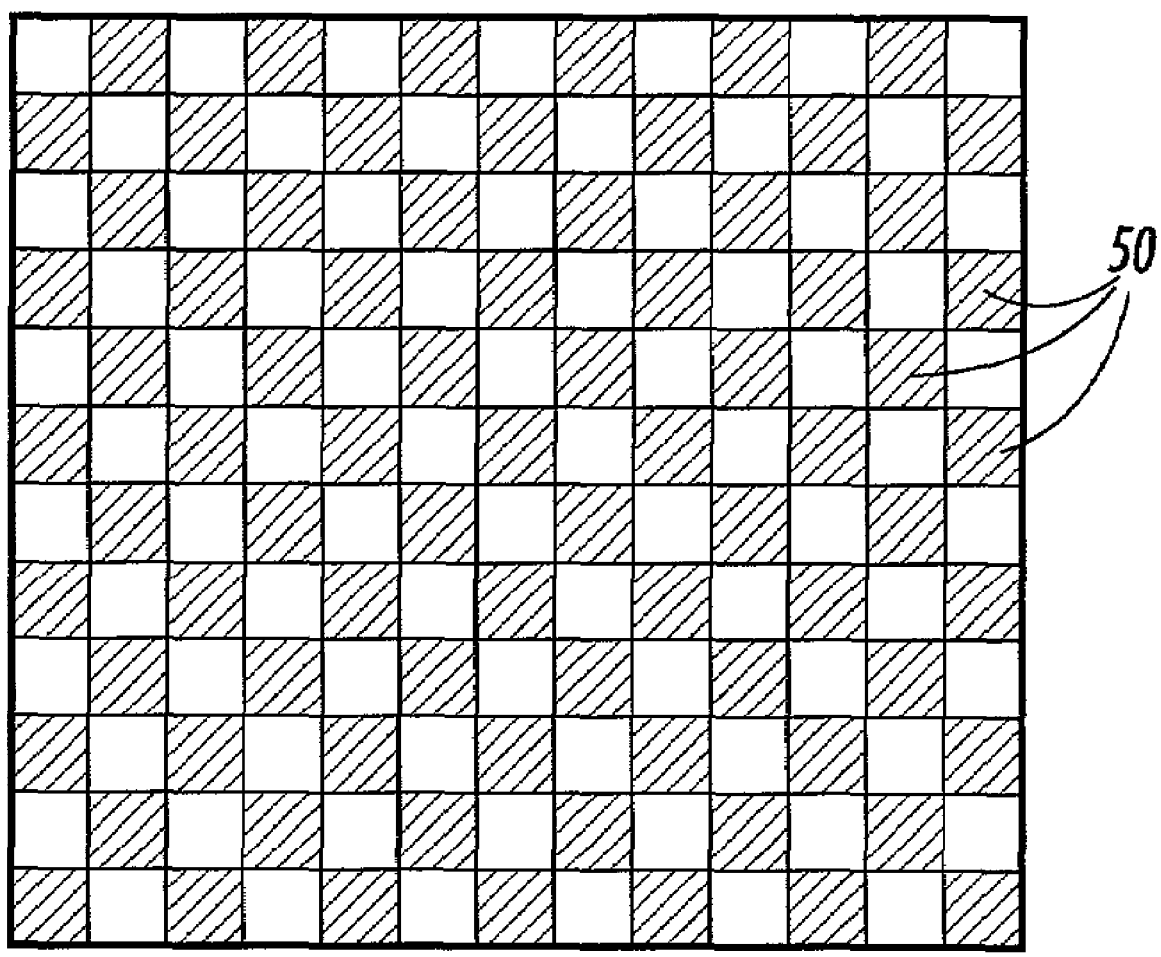
FIG. 4 illustrates a sample screen with a constraining checkerboard pattern imposed on the screen.

Referring to FIG. 4, therein is shown an example of a conventional screen for use in a halftoning process with a checkerboard pattern imposed thereon. In the screen of FIG. 4, the cross hatched pixels 50 represent black positions in the checkerboard pattern. It should be appreciated that the screen shown in FIG. 4 is shown for purposes of illustrating the concept of imposing constraining patterns and not for limiting the scope of the invention. Those skilled in the art should readily recognize that numerous alternatives to the size and shape of the screen shown are available and that several design considerations including, for example, output resolution, number of output gray levels desired, image quality, processing speed and memory requirements, etc. can impact the selection of the size and shape of the screen used. Furthermore, it should be appreciated that other "checkerboard patterns" such as two black squares separated by two white squares or the like can be used.

Referring, again, to FIG. 3, the initial screen pattern generated (step 100) has advantage of placing 1's ("black" pixels) anywhere in the screen subject to the constraining pattern. Since light dithers often are more important than dark dithers, light dithers (e.g., less than 15% black dither) are often constructed first. For purposes of further discussion, it will be assumed that step 100 generates an initial screen pattern corresponding to approximately a 5% black dither. From this initial screen pattern, an initial screen mask is constructed, which when used to screen a constant gray level image of level $g_s$ should generate a dot pattern corresponding to the initial screen pattern (step 102).

Having generated the screen pattern for the initial gray level $g_s$, the process moves to iteratively build screen patterns and update the mask for gray levels that are darker than and lighter than $g_s$. Steps 104-110 generate screen patterns for the gray levels darker than $g_s$, ie., the gray levels from 5% to 100% black; while steps 114-120 generate screen patterns for the gray levels lighter than $g_s$, i.e., gray levels between 5% and 0% black.

At step 104, the process updates the gray level $g_s$ to the next darker gray level (e.g., $g_s-1$). The process then generates the screen pattern for the updated, now current, gray level at step 106. The screen pattern for each current (next darker) gray level is based on the screen pattern for the previous gray level and is generated by converting the appropriate number of 0's in the previous screen pattern to 1's for the current pattern. As above, the selection of the 0's to convert to 1's can be made in accordance with any known technique or process that generates screen patterns having visually pleasing blue noise characteristics giving consideration to the superseding checkerboard constraint. That is, when selecting the 0's to 1's in the screen pattern to be converted, the pixel(s) converted must be at a location coinciding with a black square in the checkerboard pattern imposed on the screen.

The locations corresponding to the white pixels of the checkerboard pattern are tagged as being unchangeable until the 50% black level is reached. This constraint is lifted for gray levels darker than 50% as it doesn't hold at such gray levels. That is, at a gray level corresponding to greater than 50% black, the only 0 pixels remaining to convert will correspond to white squares of the checkerboard. Thus, at gray levels darker than 50% black pixels can be added to any location within the screen pattern. Having generated the screen pattern for the current gray level (step 106), the mask can also be updated (step 108). The process repeats steps 104 through 108 until the gray level corresponding to 100% black is reached (Step 110).

The process for generating screen patterns for gray levels lighter than $g_s$ uses analogous steps as above except that the screen pattern for the next lighter gray level converts the appropriate number of 1's to 0's. At step At step 114, the process updates the gray level $g_s$ to the next lighter gray level (e.g., $g_s+1$). Step 116 generates a screen pattern for the current (updated) gray level by the appropriate number of 1's to 0's in the previous screen pattern. Here again, the screen is generated in accordance with known techniques. At the same time, the mask can be updated (step 118). The process of steps 114-118 is repeated for all gray levels lighter than $g_s$, e.g., gray levels up to 255 (step 120).

The screen generation process shown in FIG. 3, reduces the impact of frequency dependent dot placement errors and dot-to-dot interactions. For black levels less than 50%, the firing frequency is always less than half of the firing frequency at which a solid black fill is printed because the checkerboard pattern allows, at most, only every other pixel to be printed. Furthermore, even for many of the black levels greater than 50%, the variation in the firing frequency is reduced because of a more regular pattern. This allows dots to be printed with better consistency. Additionally, the geometry of the dots become simpler because of the checkerboard pattern, resulting in more uniform dot interaction that significantly reduces local graininess caused by dot-to-dot interactions.

Figure 5:
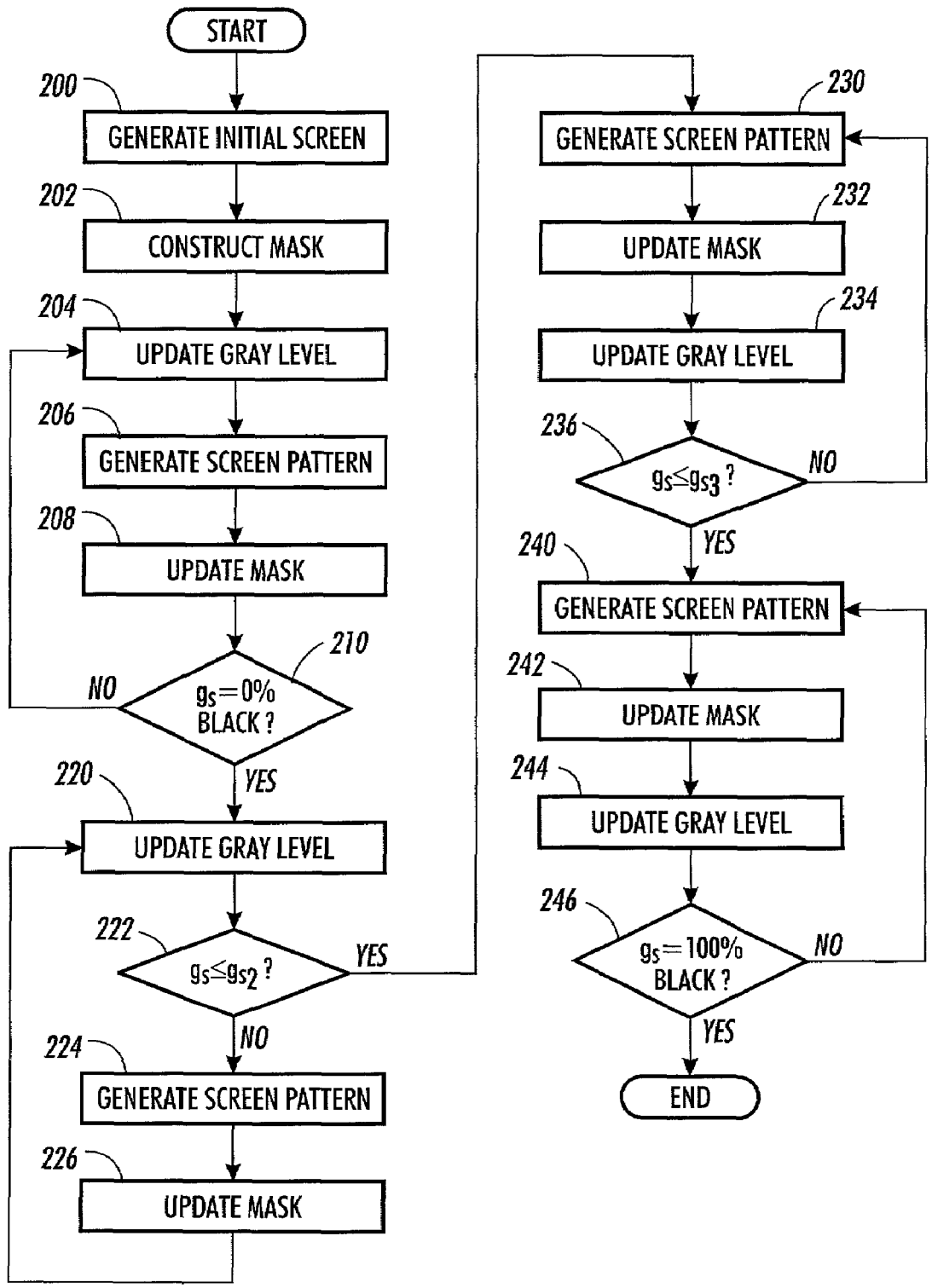
FIG. 5 is a flowchart illustrating a second embodiment of a method for generating a stochastic screen.

Those skilled in the art may recognize that a potential image quality artifact (a noticeable transition) may be encountered is around 50%. FIG. 5 illustrates one embodiment of a method to reduce the transition artifact by the introduction of noise into the screen pattern before the 50% gray level is reached. The introduction of noise can be accomplished by removing or reversing the checkerboard pattern constraint at some predetermined gray level before reaching the 50% black level.

The process shown in FIG. 5 begins by constructing an initial screen pattern for an intermediate gray level $g_{s1}$ using any known method for generating a screen pattern that is a visually pleasing blue noise dot pattern (step 200). As discussed above, in constructing the screen pattern, the placement of the 1's (black pixels in a corresponding dot pattern) is constrained by a checkerboard pattern such that the location of each of the 1's coincides with a black square in the checkerboard pattern imposed on the screen. As light dithers often are constructed first, here again for purposes of discussion it will be assumed step 200 generates an initial screen pattern for a gray level $g_1$ corresponding to approximately a 5% black dither. Although, it should be apparent to those skilled in the art that the operation can begin with a screen pattern corresponding to a gray level having greater than 50% black. From this initial screen pattern, an initial screen array is constructed (step 202). The process for generating screen patterns for gray levels lighter than $g_{s1}$, i.e., gray levels between 5% and 0% black, is the same as that of steps 114-120 of FIG. 3 described above. That is, step 204 updates the gray level $g_{s1}$ to the next lighter gray level (e.g., $g_{s1}+1$). Step 206 generates a screen pattern for the current (updated) gray level by converting the appropriate number of 1's to 0's in the previous screen pattern. Here again, the screen is generated in accordance with known techniques giving consideration to the presiding checkerboard constraint. The screen array can then be updated by including the threshold value for the current gray level (step 208). Steps 204-208 are repeated for all gray levels lighter than $g_{s1}$, e.g., until the current gray level is 255 (step 210).

The process for generating the screen array for gray levels darker than $g_{s1}$, i.e., the gray levels for 5% to 100% black, is illustrated by steps 220-246. That is, for steps 220-246, the process begins at the initial gray level $g_{s1}$ and the corresponding initial screen pattern and mask and builds for darker gray levels (i.e., from $g_{s1}$ to gray level 0). At step 220, the process updates the gray level to the next darker gray level (e.g., $g_s-1$). At step 222, the process determines if the current (next darker) gray level reaches a first a predetermined gray level $g_{s2}$. If not, the process generates the screen pattern for the current gray level at step 224 by converting the appropriate number of 0's in the previous screen pattern to 1's in the current pattern. As above, the selection of the 0's to convert to 1's can be made in accordance with any known screen generation technique giving consideration to the overriding checkerboard constraint. When converting the appropriate number of 0's to 1's in the screen pattern, those pixels converted are constrained to be at a location coinciding with the black pixels in the checkerboard pattern imposed on the screen. At the same time, the mask can also be updated to include the threshold value for the current gray level (step 226). The process then returns to step 220 to move to the next darker gray level.

If, at step 222, the current gray level is found to be less than or equal to $g_{s2}$ (i.e., the current gray level corresponds to a black level that is darker than that of $g_{s2}$), the process continues generating screen patterns with steps 230-236 wherein a certain amount of noise is introduced into the screen pattern. More specifically, at step 230 a screen pattern is generated for the current gray level. The screen pattern is generated by converting the appropriate number of 0's in the previous screen pattern to 1's in the current pattern. As above, the selection of the 0's to convert to 1's can be made in accordance with any known stochastic screen generation technique. However, to introduce noise into the screen pattern, the prior constraint of forcing the newly added 1's to coincide with the black pixels in the checkerboard pattern is either lifted or reversed. Lifting the constraint allows some amount of noise to enter the screen. On the other hand, reversing the constraint by forcing the 1's to coincide with white squares on the constraining checkerboard pattern will introduce an amount of noise into the screen.

The choice of whether to lift the constraint or reverse the constraint will depend on a variety of factors including, but not limited to, the gray level $g_{s2}$, the technique used in generating the screen pattern, and the amount of noise desired (visibility of the transition artifact). Lifting the checkerboard constraint at a gray level close to 50% (e.g., $g_{s2} \geq 40\%$ black) may not allow enough noise to be introduced into the screen to overcome a transition artifact. Specifically, as the gray level $g_{s2}$ gets closer to 50%, many techniques used for generating the screen pattern will continue to build on the black squares even if the constraint is lifted. Lowering the gray level at which the constraint is lifted may allow the introduction of enough noise to overcome any transition artifact; however, this may come at the expense of a loss in the robustness. Reversing the constraint to force the addition of output pixels to coincide with white squares provides more control in the introduction of noise as one knows at what gray level the growth on white squares will begin and can estimate the number of 0's converted to 1's as the screen patterns for darker gray levels are generated.

For purposes of discussion, assume $g_{s2}$ corresponds to approximately a 40% black dither and further assume that step 230 reverses the constraint to force the addition of output pixels to coincide with white squares on the constraining checkerboard pattern. Having generated the screen pattern, the mask can also be updated to include the threshold value for the current gray level (step 232). The process then updates the gray level to the nest darker gray level at step 234. The process continues generating the screen pattern and updating the screen array until the current gray level reaches or exceeds a third predetermined gray level $g_{s3}$ (step 236).

When the current gray level, as updated at step 234, reaches the gray level $g_{s3}$, the process continues generating screen patterns with steps 240-246 wherein any previous constraints on the placement of 1's in the screen pattern are removed. Step 240 generates a screen pattern for the current gray level by converting the appropriate number of 0's to 1's in the previous screen pattern using any known screen generation technique to produce a screen pattern having blue noise characteristics. The mask is then updated to include the threshold value for the current gray level (step 242) and the gray level is updated to the next darker level (step 244). Steps 240-244 are repeated for all gray levels darker than $g_{s3}$, e.g., until the current gray level is 0 (corresponding to 100% black) as illustrated by step 246. It should be appreciated that it will only be necessary to set the gray level $g_{s3}$ when the second constraint forces the 1's added to the screen pattern to correspond to white pixels in the checkerboard pattern. In such instances $g_{s3}$ will commonly be selected to be approximately 50% black; however, it should be appreciated that other values for $g_{s3}$ may be used.

In summary, the process illustrated in FIG. 5 generates a stochastic screen which is designed to provide visually pleasing, blue noise dot profiles when thresholded at any gray level and wherein the threshold values corresponding to gray levels between $g_{s1}$ and $g_{s2}$ coincide with black positions in a constraining checkerboard pattern and the threshold values corresponding to gray levels between $g_{s2}$ and $g_{s3}$ coincide with white positions in the constraining checkerboard pattern. The process begins with the generation of a screen pattern for an initial gray level $gs_1$ and generates screen patterns for gray levels darker than $g_{s1}$. When generating the screen patterns the process is constrained to grow (convert 0's to 1's) only at locations corresponding to black pixels in a constraining checkerboard pattern. The process continues to until the gray level reaches a first threshold $g_{s2}$ at which point the constraint is reversed to force the conversion of 0's to 1's only at those locations corresponding to white pixels in the constraining checkerboard pattern. The process continues to generate screen patterns in this manner until a second threshold $g_{s3}$ is reached. That is, between levels $g_{s2}$ and $g_{s3}$, when selecting the 0s in the previous pattern to convert to 1's, only those 0's is at a location corresponding to a white pixel of the constraining checkerboard pattern may be converted. Upon reaching the gray level $g_{s3}$, the process removes all constraints and generates screen patterns by converting the appropriate number of 0's to 1's without regard to the corresponding location in the constraining checkerboard pattern.

Thus, what has been described is a method to construct halftone screen that retains many of the favorable characters of a random blue noise stochastic screen while mitigating the effects of dot placement errors. The halftone screen is a "constrained stochastic screen" that can be generated by constraining the dot placement substantially in an on-off (checkerboard) pattern when generating increased gray levels. As a noticeable transition will occur around 50% if a checkerboard pattern is used, the on-off constraint is removed or reversed at a predetermined gray level below 50%. The resulting screens may be used for the generation of gray in monochromatic images. They may also be used for the generation of color separations in polychromatic or other multiple separation images. In polychromatic or color images, these stochastic screens may be used exclusively, or in combination with other stochastic or nonstochastic screens.

The disclosed method may be readily implemented entirely in software or implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with specific embodiments thereof, it is evident that many alternatives, modifications, and variations will be apparent to those skilled in the art. The recited order of processing elements or sequences, or the use of numbers, letters, or other designations therefor, is not intended to limit the claimed process to any order except as specified in the claim itself. Accordingly, it is intended to embrace all such alternatives, modifications and variations as fall within the spirit and broad scope of the appended claims. Thus, it will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A halftone processor for converting a gray scale image comprising a plurality of in-bit pixels to a halftoned image comprising a plurality of n-bit pixel images, where m>n, the processor comprising:

a memory storing a stochastic screen, the stochastic mask being a stochastic screen constrained by a checkerboard pattern, the checkerboard pattern constrained stochastic screen comprising a set of threshold values, each threshold value in the checkerboard pattern constrained stochastic screen corresponding to a gray level, each threshold value corresponding to a gray level between a first gray level ($g_{s1}$) and a second gray level ($g_{s2}$) being positioned in the checkerboard pattern constrained stochastic screen at a pixel position corresponding to a black pixel position in the checkerboard pattern, each threshold value corresponding to a gray level between the second gray level ($g_{s2}$) and a third gray level ($g_{s3}$) being positioned in the checkerboard pattern constrained stochastic screen at a pixel position corresponding to a white pixel position in the checkerboard pattern, the first gray level ($g_{s1}$) being greater than the second gray level ($g_{s2}$), the second gray level ($g_{s2}$) being greater than the third gray level ($g_{s3}$), the third gray level ($g_{s3}$) corresponding to a black dither of 50% or less for gray levels ($g_s$) wherein x<$g_s$<y, x corresponding to 100% black, y corresponding to 0% black; and a comparator receiving the gray scale image and the set of threshold values corresponding to the checkerboard pattern constrained stochastic screen, the comparator comparing, on a pixel-by-pixel basis, a value of each pixel in the gray scale image to a corresponding threshold value in the checkerboard pattern constrained stochastic screen to produce the halftoned image.

2. The processor of claim 1, wherein the halftoned image comprises a plurality of 1-bit pixels.

3. The processor of claim 1, wherein the first gray level ($g_{s1}$) corresponds to approximately a 5% black dither and the second gray level ($g_{s2}$) corresponds to approximately a 40% black dither.

4. The processor of claim 1, wherein the second gray level ($g_{s2}$) corresponds to approximately a 40% black dither and the third gray level ($g_{s3}$) corresponds to approximately a 50% black dither.

5. The processor of claim 1, wherein the first gray level ($g_{s1}$) corresponds to approximately a 5% black dither, the second gray level ($g_{s2}$) corresponds to approximately a 40% black dither and the third gray level ($g_{s3}$) corresponds to approximately a 50% black dither.

6. A method of generating a halftone screen for converting an image received at d levels, for reproduction at c levels, where d>c, the method, in optional sequence, including: generating a first initial stochastic screen pattern for a first gray level, the initial stochastic screen pattern being constrained by a checkerboard pattern such that a black pixel in the first initial checkerboard pattern constrained stochastic screen pattern is positioned in the first initial checkerboard pattern constrained stochastic screen pattern at a pixel position corresponding to a black pixel position in the checkerboard pattern; generating a plurality of subsequent first checkerboard pattern constrained stochastic screen patterns, each subsequent first checkerboard pattern constrained stochastic screen pattern corresponding to a specific gray level that is darker than the first gray level and is lighter than a second gray level, the second gray level being darker than the first gray level, each subsequent first checkerboard pattern constrained stochastic screen pattern maintaining an arrangement of black pixels of the first initial checkerboard pattern constrained checkerboard pattern constrained stochastic screen stochastic screen pattern, pattern each subsequent first including a number of additional black pixels such that a total number of black pixels in a subsequent first checkerboard pattern constrained stochastic screen pattern is greater than a number of black pixels in the initial checkerboard pattern constrained stochastic screen pattern, each additional black pixel in the subsequent first checkerboard pattern constrained stochastic screen patterns being positioned in the subsequent first checkerboard pattern constrained stochastic screen pattern at a pixel position corresponding to a black pixel position in the checkerboard pattern; generating a second checkerboard pattern constrained stochastic screen pattern, the second checkerboard pattern constrained stochastic screen pattern-corresponding to the second gray level, the second checkerboard pattern constrained stochastic screen pattern maintaining the arrangement of black pixels of the first initial checkerboard pattern constrained stochastic screen pattern, the second checkerboard pattern constrained stochastic screen pattern including a number of additional black pixels such that a total number of black pixels in the second checkerboard pattern constrained stochastic screen pattern is greater than a number of black pixels in the initial checkerboard pattern constrained stochastic screen pattern, each additional black pixel in the second checkerboard pattern constrained stochastic screen patterns being positioned in the second checkerboard pattern constrained stochastic screen pattern at a pixel position corresponding to a black pixel position in the checkerboard pattern; and generating a plurality of subsequent second checkerboard pattern constrained stochastic screen patterns, each subsequent second checkerboard pattern constrained stochastic screen pattern corresponding to a specific gray level that is darker than the second gray level and is lighter than a third gray level, the third gray level being darker than the second gray level, each subsequent second checkerboard pattern constrained stochastic screen pattern maintaining an arrangement of black pixels of the second checkerboard pattern constrained stochastic screen pattern, each subsequent second checkerboard pattern constrained stochastic screen pattern including a number of additional black pixels such that a total number of blacks in a subsequent second checkerboard pattern constrained stochastic screen pattern is greater than a number of black pixels in the second checkerboard pattern constrained stochastic screen pattern, each additional black pixel in the subsequent second checkerboard pattern constrained stochastic screen patterns being positioned in the subsequent second checkerboard pattern constrained stochastic screen patterns at a pixel position corresponding to a white pixel position in the checkerboard pattern, the third gray level corresponding to a black dither of 50% or less for gray levels ($g_s$) wherein $x<g_s<y$, x corresponding to 100% black, y corresponding to 0% black.

7. The method of claim 6, wherein the first gray level corresponds to approximately a 5% black dither and the second gray level corresponds to approximately a 40% black dither.

8. The method of claim 6, wherein the second gray level corresponds to approximately a 40% black dither and the third gray level corresponds to approximately a 50% black dither.

9. A method for converting a gray scale image received at d levels, for reproduction at c levels, where d>c, the method, in optional sequence, including:
receiving the gray scale image including a plurality of pixels; and
comparing, on a pixel-by-pixel basis, a value of each of the pixels in the gray scale image to a corresponding threshold value in a stochastic screen, the stochastic screen being constrained by a checkerboard pattern, the checkerboard pattern constrained stochastic screen comprising a set of threshold values, each threshold value in the checkerboard pattern constrained stochastic screen corresponding to a gray level, each threshold value corresponding to a gray level between a first gray level ($g_{s1}$) and a second gray level ($g_{s2}$) being positioned in the checkerboard pattern constrained stochastic screen at a pixel position corresponding to a black pixel position in the checkerboard pattern, each threshold value corresponding to a gray level between the second gray level ($g_{s2}$) and a third gray level ($g_{s3}$) being positioned in the checkerboard pattern constrained stochastic screen at a pixel position corresponding to a white pixel position in the checkerboard pattern, the first gray level ($g_{s1}$) being greater than the second gray level ($g_{s2}$), the second gray level ($g_{s2}$) being greater than the third gray level ($g_{s3}$, the third gray level ($g_{s3}$) corresponding to a black dither of 50% or less for gray levels ($g_s$) wherein $x<g_s<y$, x corresponding to 100% black, y corresponding to 0% black.

10. The method of claim 9, wherein the first gray level ($g_{s1}$) corresponds to approximately a 5% black dither and the second gray level ($g_{s2}$) corresponds to approximately a 40% black dither.

11. The processor of claim 9, wherein the second gray level ($g_{s2}$) corresponds to approximately a 40% black dither and the third gray level ($g_{s3}$) corresponds to approximately a 50% black dither.

12. The processor of claim 9, wherein the second gray level ($g_{s2}$) corresponds to approximately a 40% black dither.

13. The processor of claim 9, wherein the first gray level ($g_{s1}$) corresponds to black dither of less than 15%.

14. The processor of claim 1, wherein the second gray level ($g_{s2}$) corresponds to approximately a 40% black dither.

15. The processor of claim 1, wherein the first gray level ($g_{s1}$) corresponds to black dither of less than 15%.

* * * * *